No. 727,054. PATENTED MAY 5, 1903.
A. F. R. ARNDT.
METAL GUARD FOR PROTECTING TREES OR OTHER OBJECTS.
APPLICATION FILED OCT. 22, 1902.
NO MODEL.
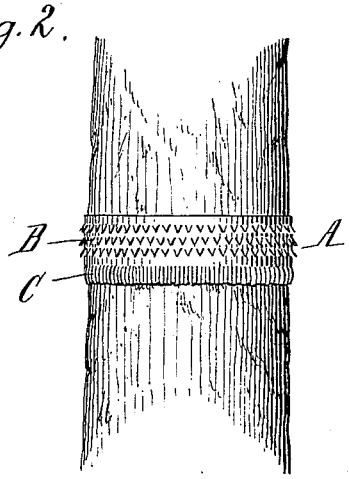
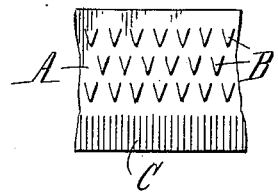
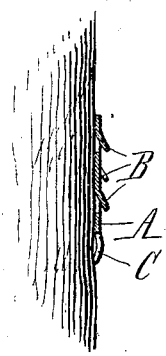
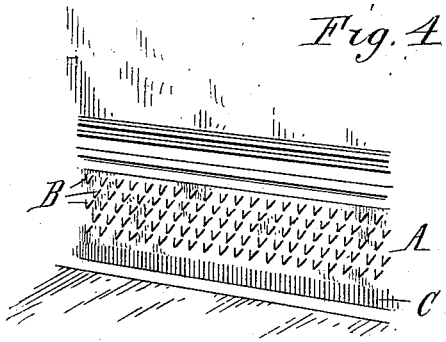
Witnesses:
C. A. Volk.
J. M. Snyder, Jr.
Albert F. R. Arndt Inventor.
By Wilhelm _____
Attorneys.

No. 727,054. Patented May 5, 1903.

UNITED STATES PATENT OFFICE.

ALBERT F. R. ARNDT, OF BUFFALO, NEW YORK.

METAL GUARD FOR PROTECTING TREES OR OTHER OBJECTS.

SPECIFICATION forming part of Letters Patent No. 727,054, dated May 5, 1903.

Application filed October 22, 1902. Serial No. 128,307. (No model.)

*To all whom it may concern:*

Be it known that I, ALBERT F. R. ARNDT, a citizen of the United States, residing at Buffalo, in the county of Erie and State of New York, have invented new and useful Improvements in Metal Guards for Protecting Trees or other Objects, of which the following is a specification.

This invention relates more particularly to a sheet-metal guard or protector for trees and the like for the purpose of preventing the passage of caterpillars, other insects, worms, or other small destructive animals to the foliage of the tree or the like and to protect it from the ravages of such insects or animals.

The invention, however, is not restricted to the protection of trees, but is also adapted to be applied to various objects and in various places to prevent the passage of insects and small destructive animals—such, for instance, as roaches, rats, and mice.

The object of the invention is to provide a sheet-metal guard which will effectually prevent the passage thereover or past the same of insects, worms, small animals, or the like, and which is exceedingly simple and inexpensive in construction.

In the accompanying drawings, Figure 1 is a plan view of a guard strip or piece embodying the invention. Fig. 2 is an elevation, on a reduced scale, showing the guard applied to the trunk of a tree. Fig. 3 is a fragmentary sectional elevation of a tree-trunk provided with the guard. Fig. 4 is a perspective view, on a reduced scale, showing a piece of the guard applied to the base-board of a room.

Like letters of reference refer to like parts in the several figures.

The guard consists of a strip or piece A of thin sheet metal, which may be of any desired size and shape and the form of which may be varied to better suit the particular use to which the guard is to be put. The sheet is provided with numerous sharp-pointed prongs, barbs, or teeth B, which are stamped or struck up from the sheet by suitable means, with their points all preferably extending in the same general direction. In the form of the guard shown in the drawings the prongs, barbs, or teeth are arranged in rows, with the teeth of one row staggered with relation to the teeth of the next row; but while this arrangement is preferred for the reason that a great number of teeth can be provided without unduly weakening the sheet or strip it is not essential, and the prongs, barbs, or teeth may be disposed in any other fashion, permitting a large number of teeth with small intervening spaces. The guard strip or sheet is also slit or divided along one edge to form numerous marginal narrow fingers or strips C. When the guard is secured around the trunk of a tree, as shown in Fig. 2, it is arranged with the slit edge downward, and the marginal fingers, which are flexible, readily conform to or are bent to conform to the irregularities of the bark of the tree or other surface to which the guard is applied, so as to enter the crevices thereof. They thus effectually close any spaces between the surface and the guard-plate and prevent the insects or animals from getting in between the guard and the surface and passing the former. To pass the guard, the insects or animals must crawl over its outer barbed surface, and this they are prevented from doing by the downwardly-pointed sharp barbs. If preferred, both longitudinal edges of the guard can be provided with the marginal fingers C, and this may be desirable for some uses of the guard. The guard can be made and sold in shapes and sizes adapting it for special purposes, or it can be made in the form of a continuous web or strip, from which pieces of any desired length can be cut.

Fig. 4 shows the guard applied to the base-board of an apartment to prevent roaches, other insects, mice, or other small animals from crawling up the wall. The guard is also well adapted for stopping mice or rat holes and for various other uses, which it is not believed necessary to illustrate.

I claim as my invention—

1. A guard consisting of a strip or piece of sheet metal provided with numerous sharp barbs or prongs projecting from the surface thereof and having an edge slit to provide numerous marginal fingers which are adapted to conform to the irregularities of the surface or object to which the guard is applied, substantially as set forth.

2. A guard for protecting trees and the like, consisting of a strip or piece of sheet metal secured around the trunk of the tree and provided with numerous sharp barbs or prongs projecting downwardly from the surface of the strip or piece, and having the lower edge thereof slit to provide numerous marginal fingers adapted to conform to the irregularities of the trunk of the tree, substantially as set forth.

Witness my hand this 21st day of October, 1902.

ALBERT F. R. ARNDT.

Witnesses:
JNO. J. BONNER,
CLAUDIA M. BENTLEY.